(No Model.)
J. E. LEWIS.
HARVESTER CUTTER BAR.
No. 276,838.  Patented May 1, 1883.
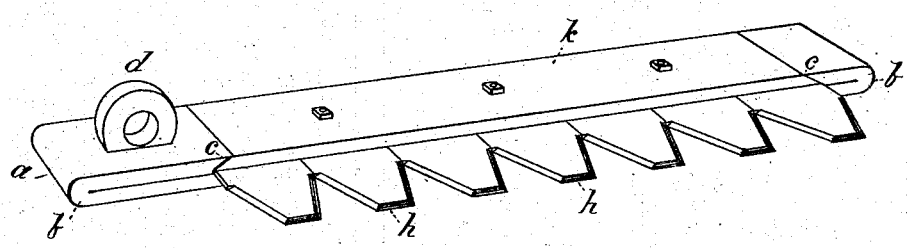
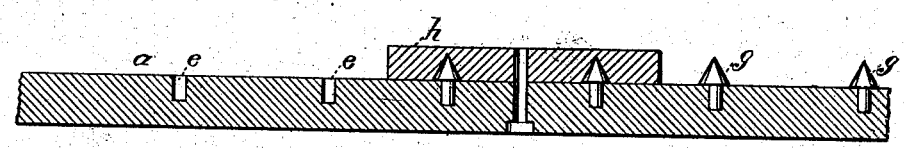
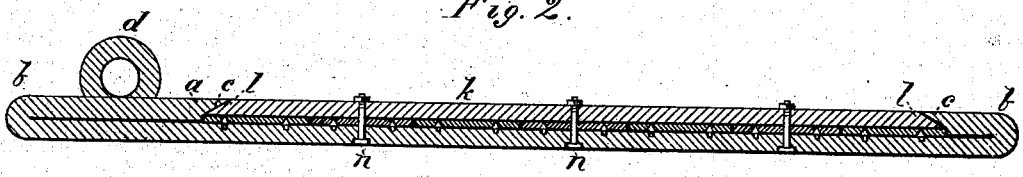
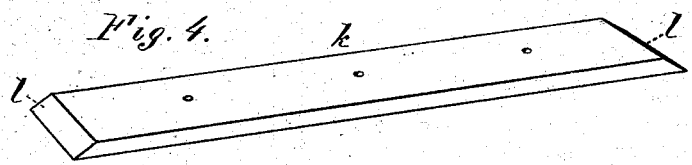
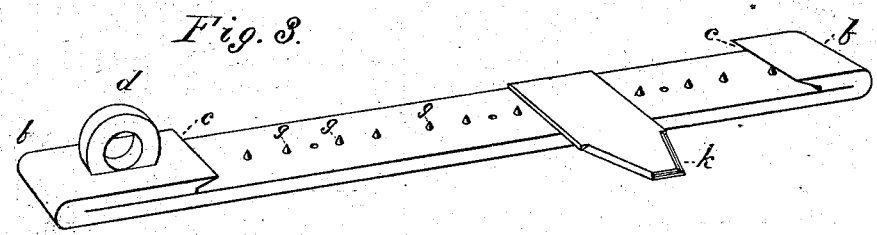
WITNESSES
Villette Anderson.
Philip C. Masi
INVENTOR
Jason E. Lewis,
by Anderson & Smith
his ATTORNEYS

UNITED STATES PATENT OFFICE.

JASON E. LEWIS, OF HESPERIA, MICHIGAN.

HARVESTER CUTTER-BAR.

SPECIFICATION forming part of Letters Patent No. 276,838, dated May 1, 1883.

Application filed October 17, 1882. (No model.)

*To all whom it may concern:*

Be it known that I, JASON E. LEWIS, a citizen of the United States, and a resident of Hesperia, in the county of Oceana and State of Michigan, have invented a new and valuable Improvement in Harvester Cutter-Bars; and I do hereby declare that the following is a full, clear, and exact description of the construction and operation of the same, reference being had to the annexed drawings, making a part of this specification, and to the letters and figures of reference marked thereon.

Figure 1 of the drawings is a representation of this invention in a perspective view. Fig. 2 is a longitudinal section. Fig. 3 is a perspective view of the main bar. Fig. 4 is a perspective view of the cap-bar. Fig. 5 is a detail view in section, and shows the conical studs and their recesses.

This invention relates to cutter-bars for harvesting and mowing machines; and it consists in the construction and novel arrangement of the reversely-bent ends of the main bar terminating in under-beveled bearings and the top or cap bar having bevel ends engaging said beveled bearings and bolted to the main bar, substantially as specified.

In the accompanying drawings, the letter $a$ designates the main bar, the ends $b$ of which are reversely bent over upon its main extent toward its middle portion, terminating in under-beveled bearings $c$. One of these ends $b$ is provided with the eye $d$, whereby the sickle-bar is secured to the pitman. At proper distances apart along the upper or bearing face of the main bar recesses $e$ are made for the reception of the lower ends of the dowel-studs $g$, the upper ends of which are conical in form and project above said bearing-surface to engage perforations of similar shape which are made in the teeth $h$. When the teeth are placed in position on the main bar in due engagement with the dowel-studs $g$ the top or cap bar, $k$, is applied to the main bar. This cap-bar is in length equal to the interval between the reversed ends of the main bar, and its ends are beveled, as at $l$, to engage the under bevels, $c$, of said reversed ends when the cap-bar is in place. Its ends are therefore securely held, and its middle portion is fastened to the main bar by means of bolts $n$, which may pass through perforations made in the cutter-sections. The teeth, however, are not designed to be held in position by the bolts, but by the dowel-studs hereinbefore described.

A sickle-bar having vertical studs rising from a rabbet in its face has been combined with perforated cutter-sections, a lock-bar, and securing-screws, and a cutter-bar provided with a longitudinal groove in its face has been combined with notched and grooved cutter-sections and a detachable ribbed fastening-plate prior to my invention, and I claim neither of these constructions, broadly, herein.

Having described this invention, what I claim, and desire to secure by Letters Patent, is—

The main bar $a$, having the reversely-bent and under-beveled ends $b$, and the stud-recesses $e$, the cutter-sections $h$, dowel-studs $g$, end-beveled cap-bar $k$, and bolts $n$, substantially as specified.

In testimony that I claim the above I have hereunto subscribed my name in the presence of two witnesses.

JASON E. LEWIS.

Witnesses:
 WM. TIFFANY,
 ORLANDO D. HAWLEY.